No. 687,453. Patented Nov. 26, 1901.
L. R. FAUGHT.
CAR WHEEL.
(Application filed Sept. 25, 1901.)
(No Model.) 2 Sheets—Sheet 2.
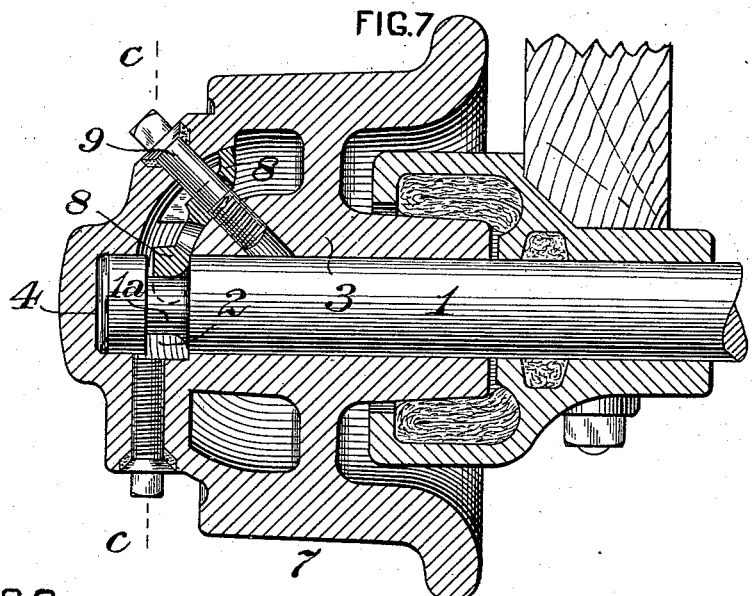
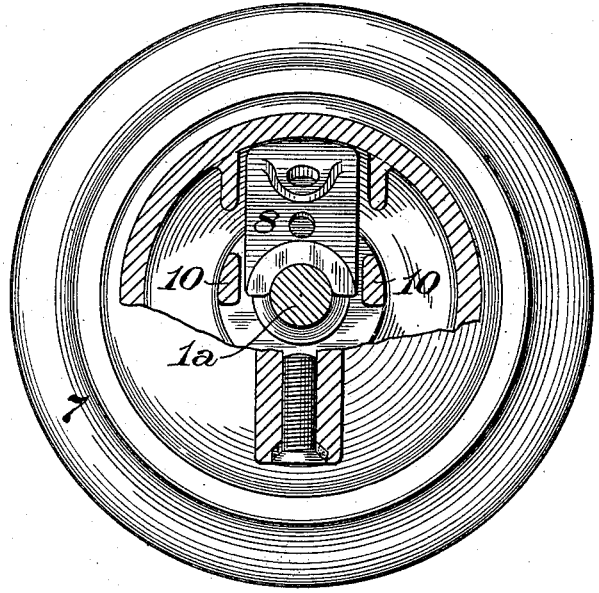
WITNESSES: James C. Herron. S. R. Bell.
INVENTOR, L. R. Faught, by Andrew Bell, Att'y.

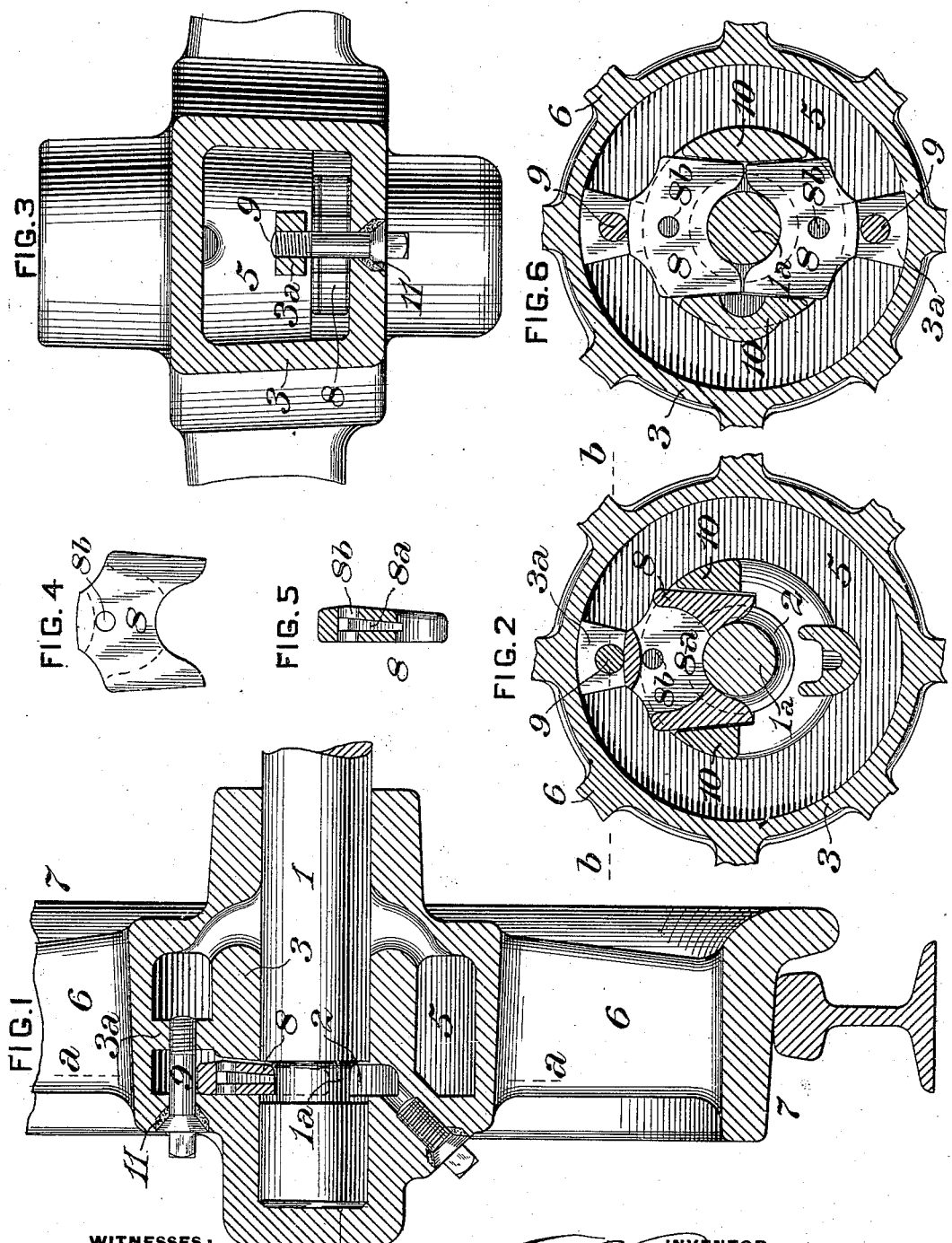

UNITED STATES PATENT OFFICE.

LUTHER R. FAUGHT, OF PHILADELPHIA, PENNSYLVANIA.

CAR-WHEEL.

SPECIFICATION forming part of Letters Patent No. 687,453, dated November 26, 1901.

Application filed September 25, 1901. Serial No. 76,449. (No model.)

*To all whom it may concern:*

Be it known that I, LUTHER R. FAUGHT, of Philadelphia, in the county of Philadelphia and State of Pennsylvania, have invented a certain new and useful Improvement in Car-Wheels, of which improvement the following is a specification.

My present invention more particularly relates to railroad-car wheels of the type ordinarily known as "loose" wheels, which are mounted upon their axles with the capacity of rotation independently thereof, but is equally applicable in connection with supporting or carrying wheels, either flanged or flat, of various other descriptions—as, for example, those employed in overhead trolleys and conveyers, warehouse and factory trucks, scales, and other vehicles or movable structures.

My present invention is an improvement upon that for which Letters Patent of the United States No. 321,590 were granted and issued to me under date of July 7, 1885; and its object is to provide means for attaining a more perfect performance of the functions of the invention of said Letters Patent—*i. e.*, those of maintaining a loose wheel in normal position upon its axle and enabling proper lubrication of the bearing-surfaces of the wheel to be effected, for preventing impairment of the normal action of the parts when the wheel and axle become worn, and for presenting a materially-increased area of bearing-surface in the connecting members of the wheel and axle.

The improvement claimed is hereinafter fully set forth.

In the construction set forth in Letters Patent No. 321,590 aforesaid the wheel is held in position longitudinally upon the axle by means of an insertible and removable connecting member, termed a "key-block," which fits in a recess or socket in the wheel-hub and engages an adjacent groove turned in the axle, the key-block being passed into the wheel through the central bore or opening through which the hub fits around the axle and after being engaged with the hub-socket and axle-groove being secured and held in such operative position by a locking screw or pin. While this construction has been found in an extended practice to satisfactorily perform the functions for which it was designed, it will be seen that the connecting key-block is necessarily subject to a structural restriction in its size whether the wheel be of the open or closed hub type, inasmuch as it cannot in any dimension be permitted to exceed the diameter of the bore of the hub, through which only it can be introduced into the wheel. This restriction of the dimensions of the key-block involves a corresponding limitation of the area of its bearing-surfaces on the axle-groove, which area to obtain the most effective results should be made as large as practicable. My present invention provides a key-block which, as hereinafter explained, is not introduced through the bore of the wheel-hub and which when once installed in the hub is never removed therefrom and the dimensions of which are therefore not limited by the diameter of the bore. The increased area of bearing-surface of the key-block on the axle-groove which is made available by my improved construction materially enhances the effectiveness and durability of the connecting members.

In the accompanying drawings, Figure 1 is an axial section through a car-wheel with the axle thereof in elevation, illustrating an application of my invention; Fig. 2, a vertical transverse section through the same on the line *a a* of Fig. 1; Fig. 3, a horizontal transverse section the line *b b* of Fig. 2; Fig. 4, a front view of the key-block detached; Fig. 5, a vertical central section through the same; Fig. 6, a section similar to that of Fig. 2, showing the application of two key-blocks; Fig. 7, a section similar to that of Fig. 1, showing a modified form of key-block; Fig. 8, a vertical transverse section on the line *c c* of Fig. 7; Fig. 9, a front view of the key-block of Figs. 7 and 8 detached, and Fig. 10 a vertical central section through the same.

My invention is herein exemplified as applied in connection with a car-wheel which is substantially similar to that shown in Letters Patent No. 321,590 aforesaid—that is to say, one which is mounted and rotates freely upon a plain cylindrical axle 1, which is devoid of the usual raised collars and has an annular groove or recess 2 formed peripherally upon it adjacent to its ends. The hub 3 of the wheel is bored out to fit freely on the axle and is preferably closed entirely at its outer end, forming thereat on its inner side a transverse bearing-surface 4, which abuts against the end of the axle. An oil chamber or reservoir 5 is formed within the hub 3, communicating with the central bore thereof, and is adapted to be supplied with lubricant through an opening which is closed by a suitable removable plug, which may either be the locking-screw presently to be described or a plug specially provided for the purpose. The arms 6 and rim 7 of the wheel are of the usual construction. The wheel is, as in Letters Patent No. 321,590, maintained in normal position longitudinally upon the axle and its lateral movement thereon prevented by a key-block 8, which fits within the groove 2 of the axle and within a recess or socket of corresponding width formed in the hub 3 of the wheel in line with the groove 2, said key-block, which has its inner face curved to fit over the reduced diameter of the axle within the groove, with only a narrow bearing thereon, being retained in position in the groove and recess by a locking screw or pin 9, which in the instance shown passes through an opening in the hub and over the outer face of the key-block and engages a female thread in a rib $3^a$, extending from the central portion of the hub to the shell or outer wall thereof.

The key-block 8 of my present invention, which is preferably formed of cast-steel, is distinguished from that of Letters Patent No. 321,590 in the essential and material structural particular of extending around substantially one-half the circumference of the neck $1^a$ of the axle, (which is that portion thereof at the bottom of the groove 2,) thereby presenting front and rear bearing-surfaces for contact with the bearing-surfaces on the sides of the groove 2, which by reason of such circumferential extent of the key-block are of materially-increased area relatively to the maximum area of bearing-surface which is obtainable for any given diameter of axle in the key-block of Letters Patent No. 321,590, the restriction of the dimensions of which due to the necessity of entering it through the bore of the wheel-hub has been hereinabove noted. The capability of providing such material increase of bearing-surface in the key-block of my present invention is resultant upon a novel manner of installing it in the wheel-hub, the same consisting in setting and supporting it in connection with a proper system of cores and vents in a mold and casting the wheel around it, the key-block being thereby inclosed in the wheel when cast in proper position to engage the groove 2 of the axle when the latter is inserted in the wheel. The method of locating the key-block in the wheel and the mold in which it is practiced as above generally indicated are not claimed as of my present invention and will constitute the subject-matter of separate applications to be filed in due time.

The key-block 8 is preferably, as shown, cored out in such manner as to provide a vertical recess $8^a$ and a transverse passage $8^b$, extending through said recess adjacent to its top, these spaces being formed in the key-block for the purposes of lightening it and of affording a lateral vent from the outer portion of the key-block to the main central vent of the mold in casting the wheel. The passage $8^b$ also serves to receive a bar by which the key-block may be held out of operative position when the wheel-hub is being bored, so as to prevent it from coming in contact with the boring-cutters. Lateral displacement of the key-block is, as in the case of that of Letters Patent No. 321,590, prevented by guides or stops 10, formed by portions of the metal of the hub extending across the groove 2 and constituting the side walls of the recess in which the key-block rests, and the adjacent abutting side faces of the key-block are preferably outwardly tapered or inclined from its inner to its outer faces, as shown in Figs. 2 and 4. The vertical displacement of the key-block and its disengagement from the groove 2 which would otherwise be occasioned by gravity in the revolutions of the wheel are prevented by the locking-screw 9, which also serves as an oil-hole plug and should be provided with a suitable packer 11 to prevent leakage.

As shown in Fig. 6, two key-blocks may, if desired, be employed, these being oppositely located and each held in place by a separate locking-screw 9. The key-blocks are in this case shown as having inclined sides, and, as will be seen, they provide bearing-surfaces which extend entirely around the side walls of the groove 2 of the axle.

The connection of the wheel and axle is effected by turning the wheel into position in which the key-block and its guides will stand below the center, when the key-block will drop outwardly sufficiently far to clear the bore of the hub. The axle is then inserted and the wheel rotated until the key-block is brought to or near a vertical position above the center, when it will drop into the axle-groove 2 and is then secured in such operative position by the locking-screw 9. By corresponding operations in reverse order the wheel and axle may be disconnected and the wheel removed from the axle when desired.

The modified form of key-block shown in Figs. 7 to 10, inclusive, which embodies the essential and characteristic features of that shown in Figs. 1 to 6, inclusive, and first herein described, is more particularly designed for application in connection with axles of comparatively small diameter, in which only a small depth of axle-groove and length of axle on the outer side of said groove are practically admissible. As in the former instance, the key-block 8 extends around substantially one-half of the circumference of the neck $1^a$ of the axle and is installed in the wheel in the operation of casting the latter. In lieu, however, of being a substantially straight plate fitting between faces in the wheel-hub which are substantially perpendicular to the axle, as in the former instance, the inner and outer faces of the recess of the hub in which the key-block fits are inwardly curved or inclined, and the key-board is correspondingly inwardly curved or inclined, as shown in Figs. 7 and 10. The key-block is held in operative position by a locking-screw 9, which in this case passes through it instead of passing over its top, as in the former instance. This construction permits the hollow wheel-hub to be made of smaller size, and by reason of the angular or inclined position of the key-block in the hub it tends to engage the axle-groove with a resistance proportionate to the outward strain or pull upon the axle, its engagement with the axle being analogous to that of a pawl and ratchet.

It will be obvious to those skilled in the art that while my invention has been herein set forth as applied in connection with wheels having hubs which are closed at their outer ends it is equally applicable in open-ended-hub wheels and also that when applied in a wheel of such character the opening in the end of the hub may, if desired, be closed by a cap or plug.

I claim as my invention and desire to secure by Letters Patent—

1. The combination of an axle having an annular groove, a wheel mounted freely on said axle, a key-block fitting between guides or stops in the body of the wheel-hub and engaging the groove of the axle by bearing-surfaces which extend circumferentially around substantially one-half of the groove, and a locking pin or screw engaging the wheel-hub and retaining the key-block in the axle-groove.

2. The combination of an axle having an annular groove, a wheel mounted freely on said axle, two oppositely-located key-blocks, each fitting between guides or stops in the body of the wheel-hub and engaging the groove of the axle by bearing-surfaces which extend circumferentially around substantially one-half of the groove, and locking pins or screws, each engaging the wheel-hub and retaining the adjacent key-block in the axle-groove.

3. The combination of an axle having an annular groove, a wheel mounted freely on said axle, a key-block having outwardly inclined or tapered sides fitting between guides or stops in the body of the wheel-hub and engaging the groove of the axle by bearing-surfaces which extend circumferentially around substantially one-half of the groove, and a locking pin or screw engaging the wheel-hub and retaining the key-block in the axle-groove.

4. The combination of an axle having an annular groove, a wheel mounted freely on said axle, a key-block fitting between guides or stops in the body of the wheel-hub and having an internal recess extending from an inner curved face to its outer portion, said key-block engaging the groove of the axle by bearing-surfaces which extend circumferentially around substantially one-half of the axle-groove, and a locking pin or screw engaging the wheel-hub and retaining the key-block in the axle-groove.

5. The combination of an axle having an annular groove, a wheel mounted freely on said axle and having a rearwardly curved or inclined bearing-face in its hub, a correspondingly curved or inclined key-block fitting said bearing-face and fitting between guides or stops in the body of the hub, said key-block engaging the groove of the axle by bearing-surfaces which extend circumferentially around substantially one-half of the axle-groove, and a locking pin or screw engaging the wheel-hub and retaining the key-block in the axle-groove.

LUTHER R. FAUGHT.

Witnesses:
ISAAC M. YOUNG,
GEO. W. CLEMENT.